United States Patent [19]
Barner et al.

[11] Patent Number: 5,200,093
[45] Date of Patent: Apr. 6, 1993

[54] SUPERCRITICAL WATER OXIDATION WITH OVERHEAD EFFLUENT QUENCHING

[75] Inventors: Herbert E. Barner, Kinnelon; Chiung-Yuan Huang, Glen Ridge, both of N.J.; William R. Killilea, West Chelmsford; Glenn T. Hong, Tewksbury, both of Mass.

[73] Assignee: ABB Lummus Crest Inc., Bloomfield, N.J.

[21] Appl. No.: 709,264

[22] Filed: Jun. 3, 1991

[51] Int. Cl.$^5$ .......................... C02F 1/74; C02F 11/08
[52] U.S. Cl. ........................................ 210/761; 210/765
[58] Field of Search ............... 210/761, 762, 765, 766, 210/908, 909

[56] References Cited
U.S. PATENT DOCUMENTS 3,920,506  11/1975  Morgan ........................... 210/761
4,543,190   9/1985  Modell ............................. 210/761
4,822,497   4/1989  Hong et al. ...................... 210/761
5,100,560   3/1992  Huang .............................. 210/761
5,106,513   4/1992  Hong ................................ 210/761

Primary Examiner—Thomas Wyse
Attorney, Agent, or Firm—Paul J. Lerner

[57] ABSTRACT

In a supercritical oxidation process, the oxidized supercritical fluid effluent (46) discharged from the upper region of the reactor vessel (10) is contacted with a cold quench liquid (66) so as to produce a relatively solids free vapor stream (53) and a liquid stream (51) containing the bulk of the precipitates and other solids carried over in the oxidized supercritical fluid effluent (46). The temperature of the resultant liquid stream (51) is maintained at a temperature below the solids solubility inversion temperature, typically below 600° F., so as to dissolve a substantial portion of the precipitates and other solids collected therein.

5 Claims, 2 Drawing Sheets

SUPERCRITICAL WATER OXIDATION WITH OVERHEAD EFFLUENT QUENCHING

BACKGROUND OF THE INVENTION

The present invention relates generally to the oxidation of a broad spectrum of waste material and, more particularly, to a method and apparatus for the wet oxidation of organic waste, including organic waste having inorganic contaminants such as metals or metallic compounds, at supercritical temperature and pressure conditions, or at supercritical temperatures and elevated, yet subcritical, pressure.

One known method of oxidizing waste material, such as municipal sewage or industrial sludges, commonly referred to as supercritical water oxidation, is disclosed in U.S. Pat. Nos. 4,113,446; 4,338,199; and 4,543,190. In this oxidation method, the waste material is pressurized and fed into a reactor vessel along with compressed oxidant, either oxygen, air or oxygen-enriched air, and maintained therein under supercritical temperature conditions, that is at a temperature above 374° C., and, elevated pressure, to cause rapid oxidation. Under supercritical conditions, water exists in a high-energy, dense-vapor form and is consequently capable of dissolving normally insoluble organics thereby permitting separation from and disposal of inorganic contaminants such as metallic halides, sulfur compounds, light metal elements such as sodium and the like, and heavier toxic metals such as lead, mercury and the like. The end products of the wet supercritical oxidation process are carbon dioxide, salt, water and heat.

A commercially practiced method of carrying out supercritical water oxidation, and a reactor vessel particularly adapted therefor, are disclosed in U.S. Pat. No. 4,822,497. As disclosed therein, an aqueous waste stream containing organic and inorganic material is pressurized and fed along with compressed oxygen or air into the upper region of a pressure vessel. This reactor vessel is comprised of two zones: a supercritical temperature zone and a subcritical temperature zone, the subcritical temperature zone being maintained in the lowermost region of the reactor vessel and the supercritical zone being maintained above the subcritical zone. The pressurized feed waste material and the compressed oxidant are admitted via a feed pipe extending into the upper region of the reactor vessel into the supercritical temperature zone. Alkaline material may be injected into the feed stream in order to neutralize any acids formed during the oxidation process. Reaction product gas and effluent from the supercritical temperature zone exit via a nozzle and associated piping. A portion of the effluent is recycled to heat the incoming aqueous waste feed stream, while the remainder of the reactor effluent is cooled, depressurized and discharged in separate gaseous and liquid product streams.

Oxidation of the organics and oxidizable inorganics takes place in the supercritical temperature zone. The material, usually inorganic salt, that is initially present or formed in the supercritical or semicritical fluid phase and is insoluble therein forms dense brine droplets or solid precipitates which inertially impinge on, and fall by gravity into, a liquid phase, still at elevated pressure, provided in the lower temperature, subcritical zone maintained in the lower portion of the vessel. The liquid phase in the subcritical zone provides an aqueous medium for trapping solids, for dissolving soluble materials, and for forming a slurry of insoluble materials. The resultant solution or slurry is removed from the reactor vessel via a pipe opening in the lower region of the vessel.

The inorganic salts which are insoluble in the supercritical or semicritical fluid phase in the reactor vessel may to a lesser or greater extent be tacky, possibly depending on the nature of the feed material and/or operating conditions in the reactor. Organic halogen and sulfur in the waste feed material have been found to react with alkaline material in the feed to form inorganic salts which have extremely limited solubility at supercritical conditions. These insoluble inorganic salts have been known to deposit on the walls of the reactor vessel within the supercritical zone and also on parts of the outlet nozzle from the supercritical zone. Uncontrolled deposition and build up of solids on the reactor vessel wall will require periodic shut down of the reactor to permit flushing and backwashing to remove accumulated solids. As the frequency at which shut down will be necessary will depend on the "tackiness" of the solids, the operating conditions within the reactor vessel, the nature of the waste feed material and likely other conditions, shut downs cannot be predictably planned.

SUMMARY OF THE INVENTION

The present invention provides an improved supercritical oxidation process, the improvement comprising contacting the oxidized supercritical fluid effluent discharged from the upper region of the reactor vessel with a cold quench liquid so as to produce a relatively solids free vapor stream and a liquid stream containing the bulk of the precipitates and other solids carried over in the oxidized supercritical fluid effluent. Most advantageously, the temperature of the resultant liquid stream is maintained at a temperature below the solids solubility inversion temperature so as to dissolve a substantial portion of the precipitates and other solids collected therein prior to subjecting the resultant liquid to further cooling and depressurizing.

DETAILED DESCRIPTION OF THE INVENTION

Figure 1:
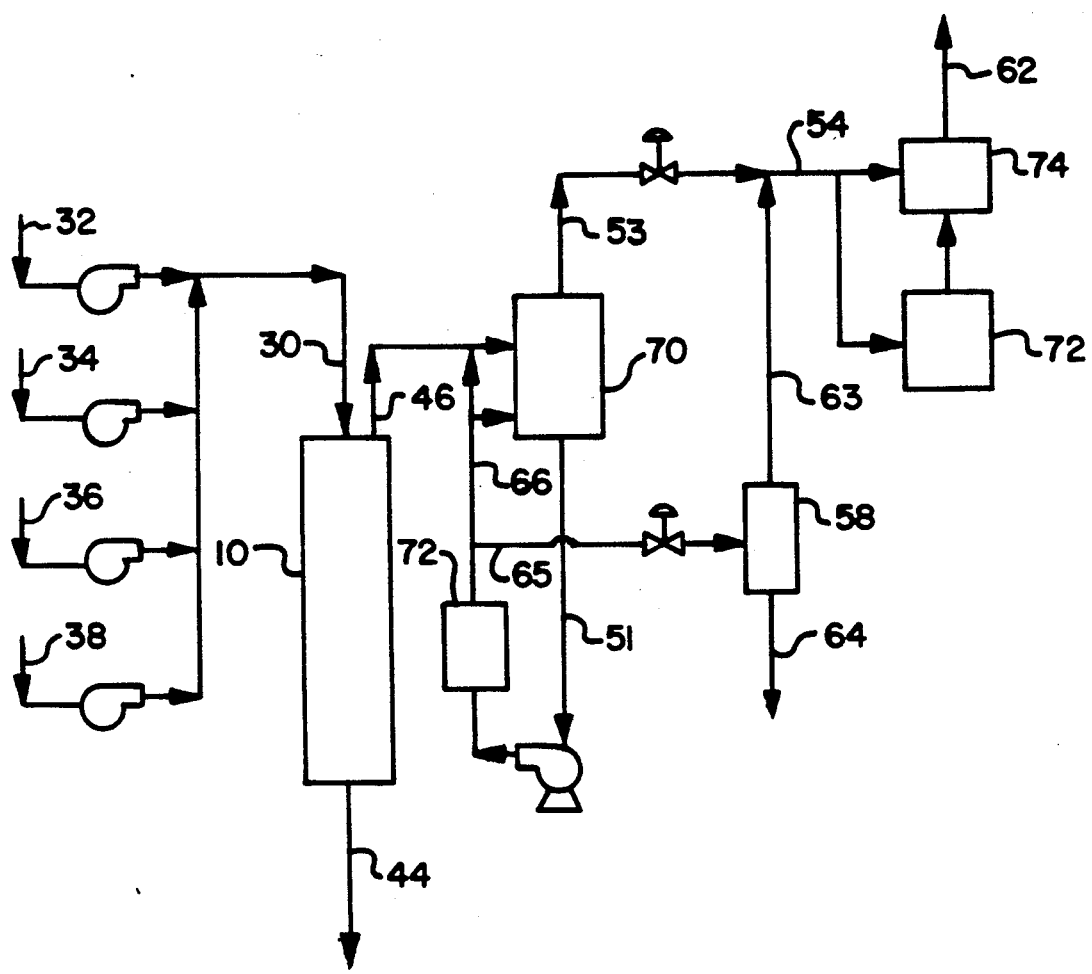
FIG. 1 is a schematic diagram of a waste stream processing system designed to carry out the process of the present invention.

Referring now to FIG. 1, the feed material 30 to be processed is pumped from atmospheric pressure to the desired pressure to be maintained within the reactor vessel. The feed generally consists of organic waste material, inorganics, particulates, sludge, soil, neutralizing agents, salt forming agents, and minerals in an aqueous medium 32, and oxidant 38 which is stored as a liquid and later vaporized. Auxiliary fuel 34 may be added if the waste material has a low heating value. Caustic 36 is usually added if any of the organic wastes contain heteroatoms which produce mineral acids and it is desired to neutralize these acids and form appropriate salts. The combined pressurized feed material 30 is admitted into the oxidizer and separator vessel 10 where it is processed as hereinafter discussed. The resultant brine or slurry 44 is removed and the combusted effluent 46 is further processed in accordance with the invention as hereinafter described.

Figure 2:
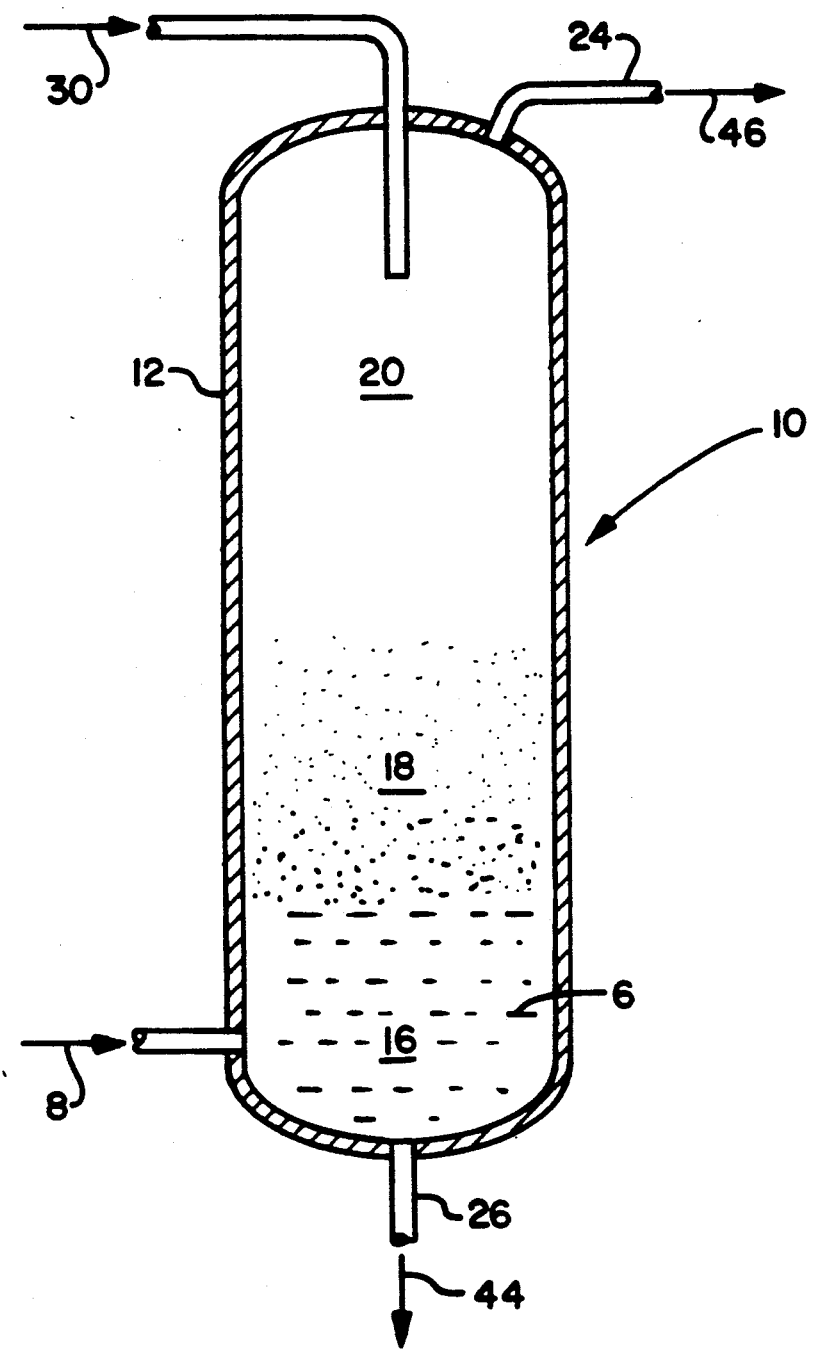
FIG. 2 is a sectional side elevation view of a preferred embodiment of the reactor vessel adapted to carry out the present invention.

The reactor vessel, as depicted in FIG. 2, most advantageously comprises an elongated, hollow cylindrical pressure vessel, capped at both ends so as to define an interior reaction chamber, and designed to be capable of withstanding the high pressures and high temperatures associated with supercritical conditions. Defined within the reaction chamber are a supercritical temperature zone in the upper region of the reactor vessel and a subcritical temperature zone therebelow in the lower region of the reactor vessel.

Oxidation of organics and oxidizable inorganics takes place in the supercritical temperature zone 20 where inorganic materials, present in the feed or formed by chemical reaction, form particulate matter or dense brine droplets by nucleation and gas phase precipitation processes. The supercritical temperature fluid phase flows downward and then reverses flow direction. The combusted effluent exits via a pipe 24 at the top of the vessel 10. Dense matter, such as inorganic material initially present or formed by reaction, which is insoluble in the supercritical temperature fluid continues along the original downward flow path due to a combination of inertia and gravity, and impinges on and falls into the liquid phase 6 provided in the lower temperature subcritical zone 16 of the vessel 10. As shown by the shading in the Figure, there is a somewhat diffuse boundary 18 between the supercritical and subcritical zones.

Pressurized liquid medium 8 such as water or an aqueous solution or mixture may be admitted into the lower region of the vessel 10 to provide the liquid phase and to establish the temperature gradient and concomitant fluid density gradient within the vessel. Alternatively, the admission of pressurized liquid medium into the subcritical zone of the vessel 10 may be omitted provided that cooling of the lower region of the reactor vessel is accomplished, thus allowing condensate to form therein, forming the liquid phase. For example, the lower portion of the vessel may be left uninsulated and allowed to cool, or be externally cooled thereby forming a condensate liquid phase within the subcritical zone. The liquid phase in the subcritical zone 16 in the lower region of the reactor vessel provides a medium for trapping solids, for dissolving soluble materials which were insoluble in the supercritical zone, and for forming a slurry of insoluble materials. The resultant solution or slurry is removed from the reactor vessel 10 via a pipe 26 opening into the subcritical zone through the bottom of the vessel.

The rate of admission and removal of liquid into and from the subcritical zone may be varied depending on operational requirements. For example, the flow of the liquid admitted into the subcritical zone may be higher than the flow of the resulting solution or slurry from the subcritical zone in order to provide for a variable liquid level within the subcritical zone that would rise up, contact, and trap the various solids and precipitates falling, by inertia and gravity, from the supercritical zone into the subcritical zone of the vessel.

In accordance with the present invention, effluent stream 46 discharged from the reactor vessel 10 through the upper outlet nozzle 24 is passed directly to a quench vessel 70 wherein the incoming effluent stream 46 is contacted with a cold quench liquid 66 to cool the effluent stream 46 to a temperature below the solids solubility inversion point. Quench liquid 66 may also be injected into effluent stream 46 upstream of quench vessel 70 so as to avoid precipitation of salts in the transfer conduit. The solids solubility inversion point is that temperature below which particulates and molecular gaseous salts stay dissolved in the liquid stream. Typically, the incoming effluent stream 46 is cooled in the quench vessel 70 to a temperature of about 450° F. to about 650° F. to ensure that the bulk of particulates and molecular gaseous salts will dissolve in the liquid stream, although it may be as high as 900° F. depending upon the salt constituency.

Discharging from the quench vessel 70 are a liquid stream 51 in which the bulk of particulates and salts in the effluent stream 46 have now dissolved and a vapor stream 53 which is relatively free of entrained particulates and salts. The liquid stream 51 is passed through a heat recovery means 72 for further cooling and recovery of a portion of the heat content thereof. Cooled stream 66 is thence passed back into quench vessel 70. Cooled stream 65 is partially depressurized and passes to separator vessel 58, from which liquid stream 64 is discharged. Vapor stream 63 from separator 58 is joined with quench vessel vapor stream 53 for further processing.

A portion of the vapor stream 53 discharging from the quench vessel 70 can be recycled to reactor separator 10 if desired. The rest of stream 53 or alternately the entire stream 53 undergoes depressurization and can be treated for further heat recovery by means of heat recovery unit 74. If required, the vapor stream 53 discharging from the quench vessel 70 may alternately be passed to a second stage oxidizer reactor 72 to complete oxidation of any remaining carbon monoxide or organics therein prior to passing stream 54 to heat recovery unit 74. Gas stream 62 discharges to the atmosphere from unit 74.

The method of the present invention for treating the overhead effluent stream 46 discharged from the reactor vessel 10 eliminates the necessity of filtering this effluent stream. In the prior art, it has been customary to provide filters at the top of the reactor vessel near the inlet to the outlet nozzle 24, such as shown in U.S. Pat. No. 4,822,497, to trap carryover solids which have not been separated by inertial and gravity forces, but rather remain entrained in the effluent stream 46. Such carryover solids are removed in order to prevent the fouling of downstream equipment, such as the heat recovery heat exchangers and transport piping. By removing these carryover solids by quenching the effluent stream 46 discharging from the reactor vessel 10 prior to further processing the effluent stream, the need for such filters, and the repeated backwashing and replacement associated therewith, has been eliminated.

It will be appreciated that the invention has been described in a certain degree of particularity with respect to the specific embodiment shown in the drawings and discussed in the specification. It is to be understood that various modifications and changes may be made thereto without departing from the spirit and scope of the invention as set forth in the appended claims. Furthermore, it is to be understood that the present invention is useful for processes carried out at both supercritical temperature and pressure conditions of water and as well as supercritical temperatures in elevated, yet subcritical, pressures of water. Accordingly, it is to be understood that both a supercritical and a semicritical fluid are included within the term supercritical temperature fluid as used herein.

We claim:

1. In a supercritical water oxidation process of the type wherein a pressurized feed material including water, organics, inorganics, and oxidant are introduced into an upper region of a vertically elongated, generally cylindrical walled, closed pressure vessel defining within its interior a supercritical temperature zone in the upper region thereof and a lower temperature zone in a lower region thereof wherein a liquid phase is provided, and allowed to oxidize under supercritical temperature conditions in the supercritical temperature zone to form an oxidized super fluid phase which is discharged from the upper region of the vessel and precipitates, said precipitates and other solids passing from the supercritical temperature zone and collecting in the lower temperature zone in an aqueous brine solution which is discharged from the lower region of the vessel, the improvement comprising contacting the discharged oxidized super fluid phase with a cold quench liquid so as to produce a resultant vapor stream and a resultant liquid stream containing the bulk of any of said precipitates and other solids carried over in the oxidized supercritical fluid phase.

2. An improved supercritical oxidation process as recited in claim 1 wherein the temperature of the resultant liquid stream is maintained at a temperature below the solids solubility inversion temperature.

3. An improved supercritical oxidation process as recited in claim 2 wherein the temperature of the resultant liquid stream is in the range of about 450° F. to about 650° F.

4. An improved supercritical oxidation process as recited in claim 3 further comprising using a portion of the further cooled liquid stream as the quench liquid for contacting the discharged oxidized super fluid phase.

5. An improved supercritical oxidation process as recited in claim 1 further comprising further cooling the resultant liquid stream to recover heat therefrom.

* * * * *